J. JOHNSON.
INSECT CATCHER.
APPLICATION FILED FEB. 28, 1911.
1,016,156.
Patented Jan. 30, 1912.
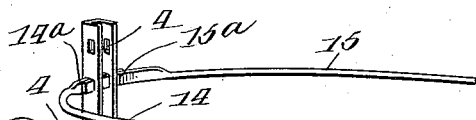
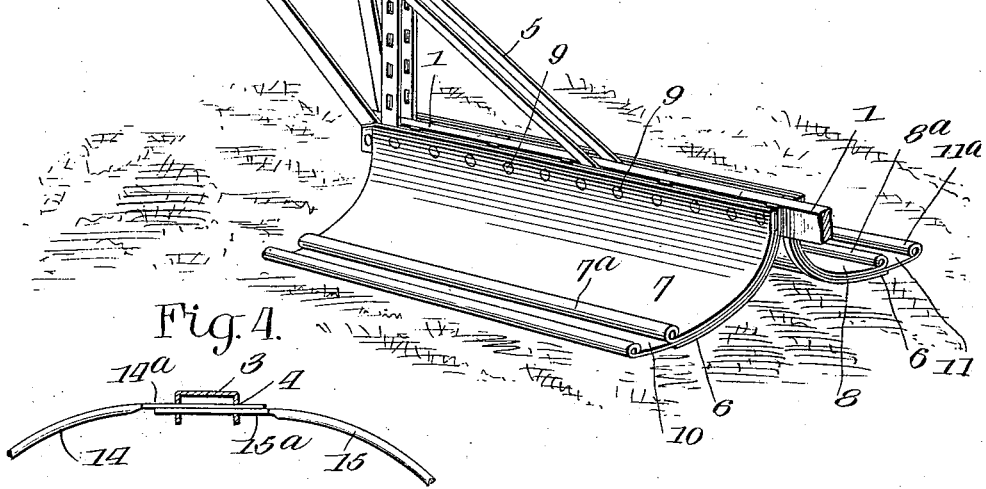
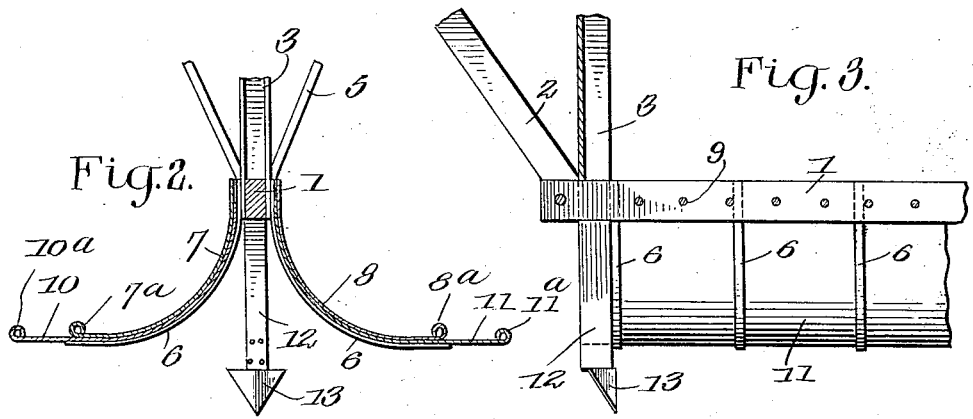
WITNESSES:
Samuel E. Wade
L. A. Stanley
INVENTOR
JACK JOHNSON
BY Munn & Co.
ATTORNEYS

UNITED STATES PATENT OFFICE.

JACK JOHNSON, OF BOLTON, MISSISSIPPI, ASSIGNOR OF TWO-THIRDS TO HERRING BROTHERS, OF BOLTON, MISSISSIPPI, A FIRM.

INSECT-CATCHER.

1,016,156. Specification of Letters Patent. Patented Jan. 30, 1912.

Application filed February 28, 1911. Serial No. 611,327.

*To all whom it may concern:*

Be it known that I, JACK JOHNSON, a citizen of the United States, and a resident of Bolton, in the county of Hinds and State of Mississippi, have made certain new and useful Improvements in Insect - Catchers, of which the following is a specification.

My invention relates to devices for catching insects, and is particularly designed to catch the insects such as boll-weevil which infest the cotton plants, and it consists in the combinations, constructions and arrangements herein described and claimed.

An object of my invention is to provide a device which may be drawn along between the rows of cotton, and which will engage the bushes so as to shake them and cause the insects to fall into receptacles.

A further object of my invention is to provide a novel form of receptacle which may be extended or adjusted so as to be used with rows which are set at varying distances apart.

A further object of my invention is to provide a device for accomplishing the above named results, which consists of few parts and is of comparatively small cost to manufacture.

Other objects and advantages will appear in the following specification and the novel features of the device will be particularly pointed out in the appended claims.

My invention is illustrated in the accompanying drawings forming part of this application in which—

Figure 1 is a perspective view of the device, Fig. 2 is a transverse section across the pans or receptacles, Fig. 3 is a vertical section of a portion of the device, and Fig. 4 is a horizontal section showing the construction of the laterally extending arms.

In carrying out my invention I provide a central draft beam 1, to the rear end of which is secured the guide handles 2, the front end being designed to receive ordinary draft devices, such as double tree (not shown).

Near the rear end of the draft beam 1 is an upright 3, which is preferably made from a single bar of iron U-shaped in cross section. The lower end of this upright is securely fastened to the beam 1 and the upper end is provided with a series of openings 4, the openings on one side of the U-shaped support being designed to register with the openings on the other side, as clearly shown in Fig. 1. Brace members 5 are secured to the upright and extend forwardly, their lower ends being secured to the draft beam 1. This construction holds the upright firmly in position.

Secured to the draft beam on either side thereof are laterally extending curved supports 6. In the drawings I have shown three of these supports on each side of the draft beam 1. Disposed above the supports 6 are the two laterally extending curved pans or receptacles 7 and 8, respectively. The pan 7 is provided on its lower edge with a roll or bead 7ª, the pan 8 being provided with a similar roll 8ª. The pans 7 and 8 are firmly secured to the beam by means of bolts 9 or other suitable fastening devices.

Between the supporting members 6 on one side and the pan 7 is an auxiliary pan 10, which is also provided with a rolled edge 10ª. On the opposite side a pan 11 is disposed between the supports 6 and the pan 8, and is provided with a rolled edge 11ª. The pans 10 and 11 are designed to be pulled outwardly, or to be pushed inwardly, these pans sliding between the upper pans and the lower supports.

In Figs. 2 and 3, I have shown a downwardly extending central post 12 provided at its bottom with a sweep 13.

The curved arms for engaging the bushes are shown in Figs. 1 and 4. Referring particularly to Fig. 4, it will be seen that I have provided an arm on each side. An arm 14 is made of round iron, and is curved as shown in the drawing. Its inner end is flattened at 14ª to enter the opening 4 in the upright 3. The arm 15 is similarly constructed, the flattened reduced portion 15ª being designed to enter the same openings, so that when these two arms are in position they fit tightly, the one pressing the other against the side of the opening.

From the foregoing description of the various parts of the device the operation thereof may be readily understood.

The device is designed to be drawn by one or more horses between the rows of cotton, the sweep 13 being kept in the bottom of the furrow between the rows. The arms 14 and 15 engage the branches of the plants and tend to shake them. The cotton "squares" which have been punctured by the boll-weevil drop off into the pans and the weevils themselves, together with other insects that are on the plants also fall into the pans. The latter are preferably coated with some adhesive matter such as tar, or other suitable preparation to which the insects will adhere. The rolls at the edges of the pans keep the insects and the "squares" from dropping off of the receptacle. When the rows are narrow the auxiliary pans may be pushed in between the upper pan and the lower supports and where the rows are wider the auxiliary pans may be pulled outwardly so as to catch all of the insects that fall from the plants. The rolled edge of the pan also serves the purpose of preventing injury to the plants themselves. By providing a number of openings 4, the arms 14 and 15 may be adjusted to accommodate plants of various heights.

The apparatus described above provides an efficient and yet a simple device for collecting the insects, and the "squares." This can be done very rapidly and a considerable field of cotton can be gone over in a short time. The curved arms 14 and 15 reach out and pull the plants over the pans, so that the insects are sure to fall upon them. Obviously arms of different length and different curvature could be provided without departing in the least from the spirit and the scope of the invention.

I claim:

1. An insect catcher comprising a central draft beam, an upright secured at the rear end of said draft beam, said upright consisting of a U-shaped bar having registering openings in its opposite sides, curved arms having flattened portions arranged to extend through said openings, the flattened portions of oppositely extending arms being arranged to engage each other for holding the arms in position on said upright, a series of laterally extending curved supporting members secured on each side of said central draft beam, a curved pan provided with a rolled edge secured on each side of said draft beam above said supporting members, and an auxiliary curved pan having a rolled edge slidably disposed between the lower supports on the draft beam and the first mentioned pan.

2. An insect catcher comprising a draft beam, an upright secured at the rear end of said draft beam and being provided with openings, curved arms having a portion adapted to enter the openings in said upright, laterally extending supporting members secured on each side of said draft beam, a pan secured on each side of said draft beam above said supporting members, and an auxiliary pan slidably disposed between the lower supports on the draft beam and the first-mentioned pans.

JACK X JOHNSON.
his mark

Witnesses:
GEORGE POWELL,
TEE SANDERS.

---

Copies of this patent may be obtained for five cents each, by addressing the "Commissioner of Patents, Washington, D. C."